Jan. 11, 1966 A. FRANKEL ETAL 3,228,859
MULTISTAGE FLASH EVAPORATORS
Filed Sept. 13, 1960 7 Sheets-Sheet 1
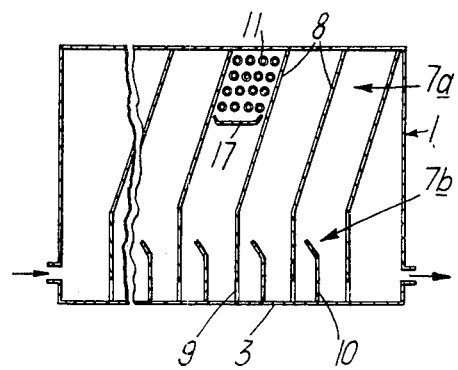
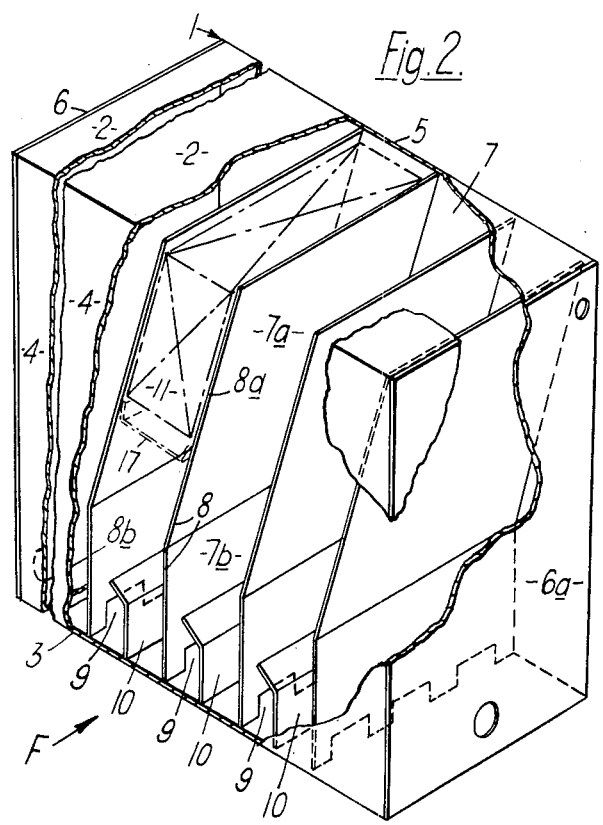
Inventors
Adolf Frankel and
Hugh Robert Morton Craig
By
Fred L. Witherspoon, Jr. Attorney

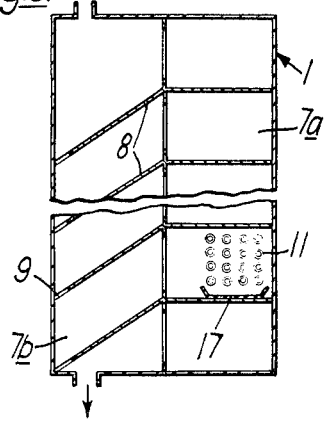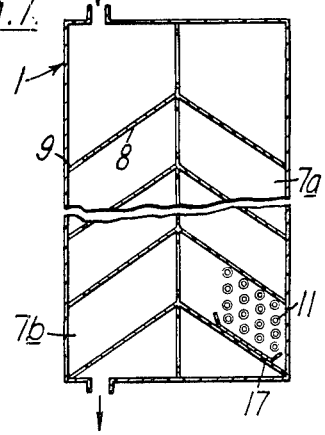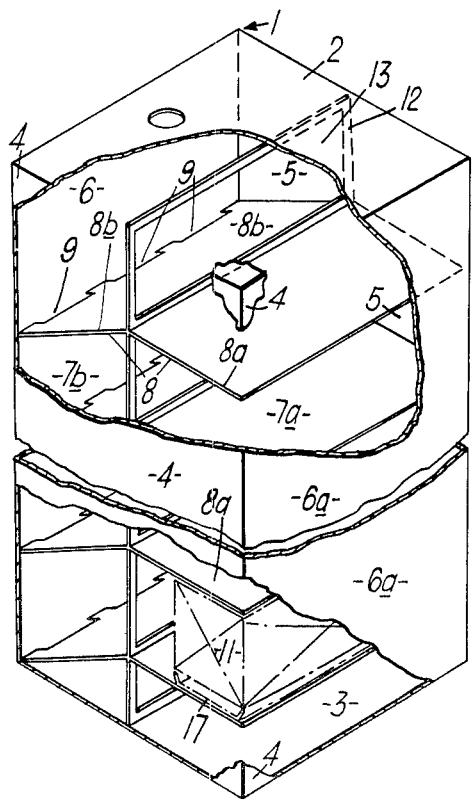

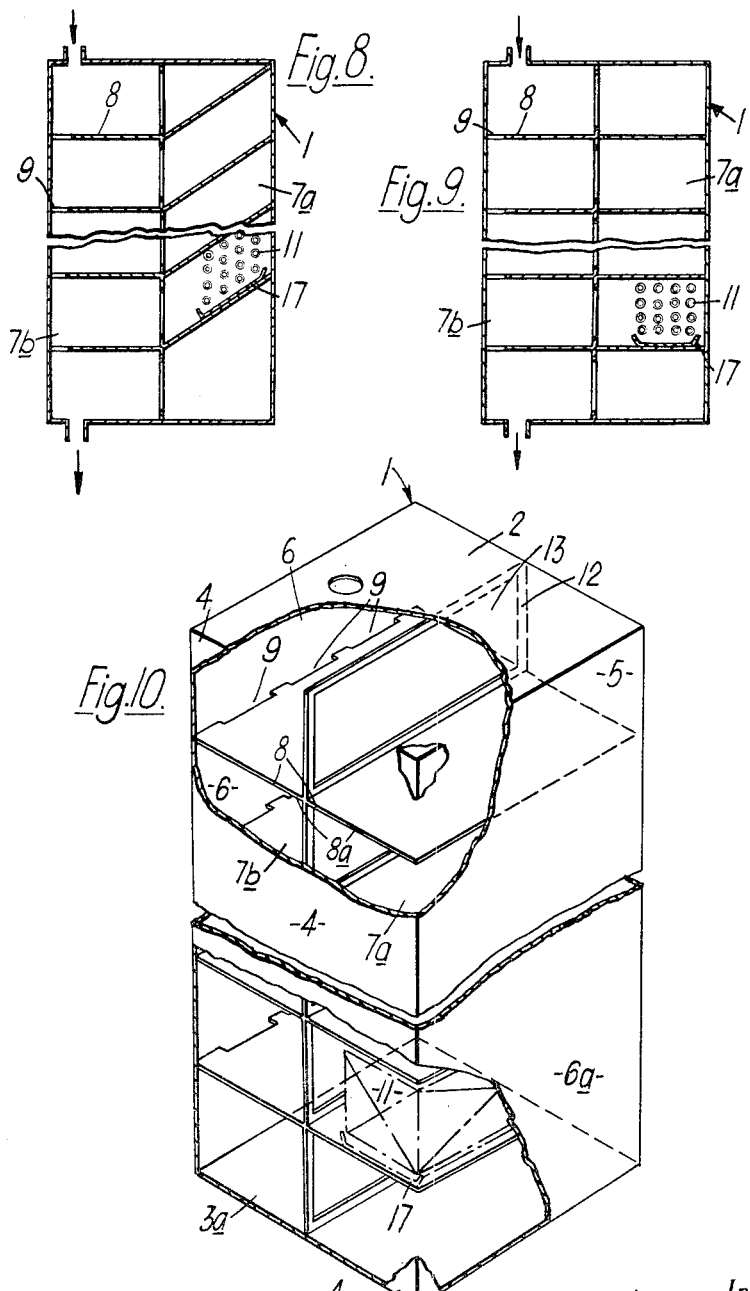

Jan. 11, 1966    A. FRANKEL ETAL    3,228,859
MULTISTAGE FLASH EVAPORATORS
Filed Sept. 13, 1960    7 Sheets-Sheet 5
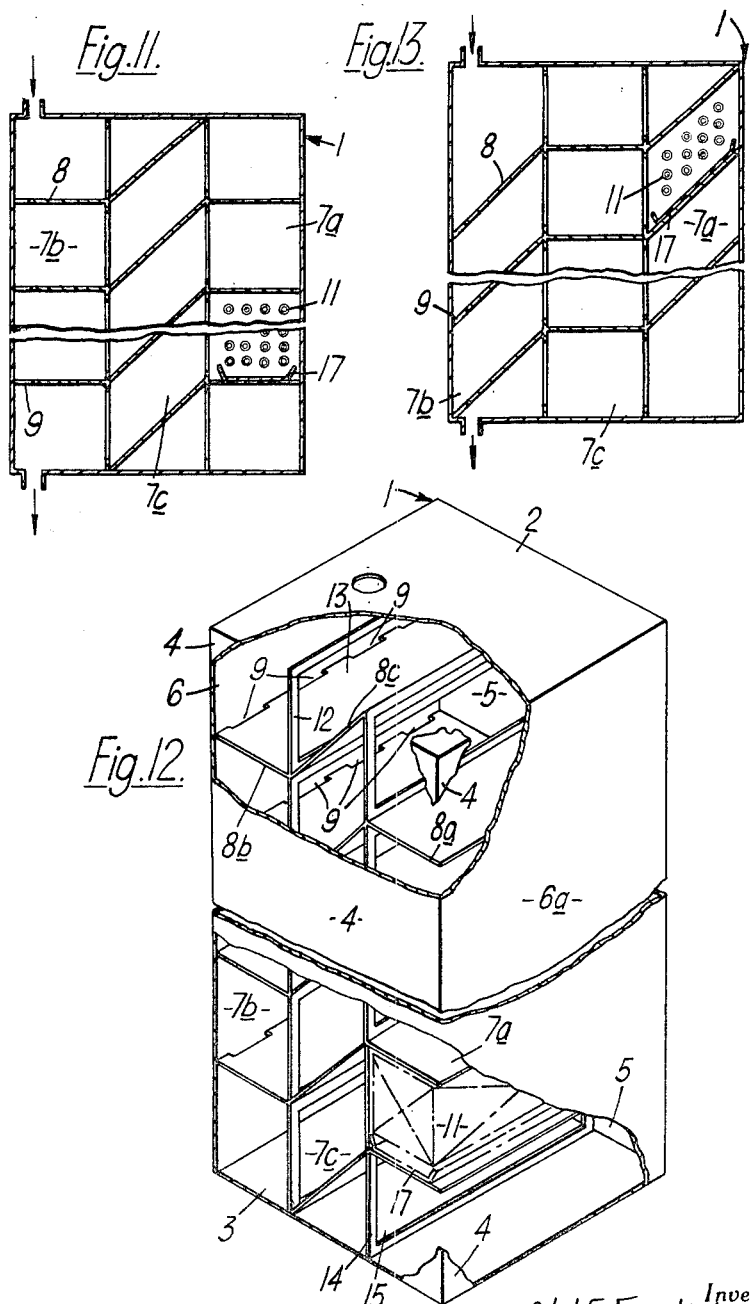
Inventors
Adolf Frankel
Hugh Robert Morton Craig
By
Fred L. Witherspoon, Jr. Attorney

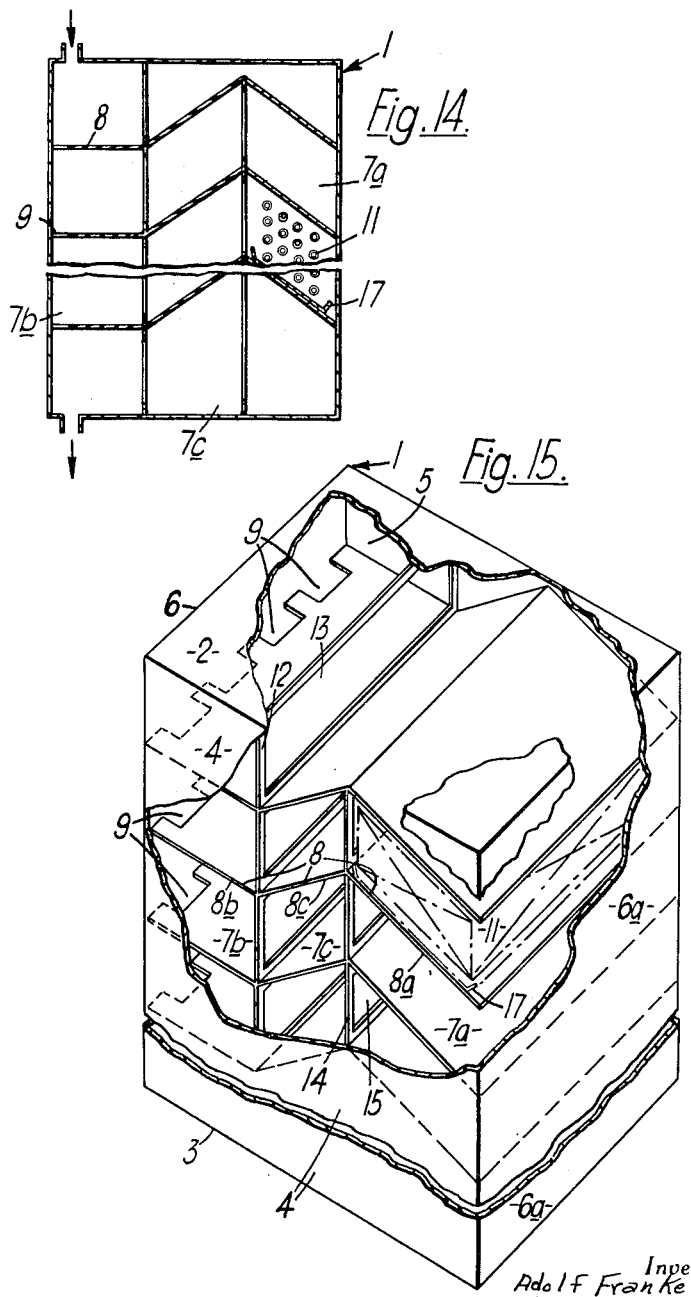

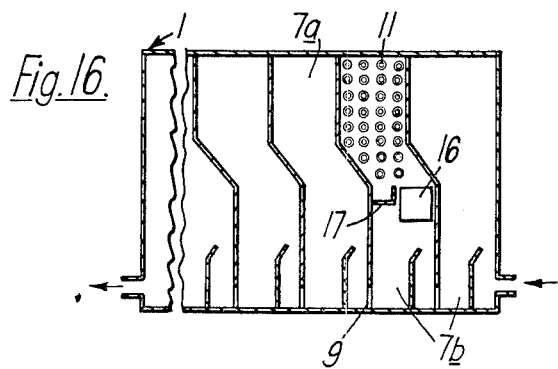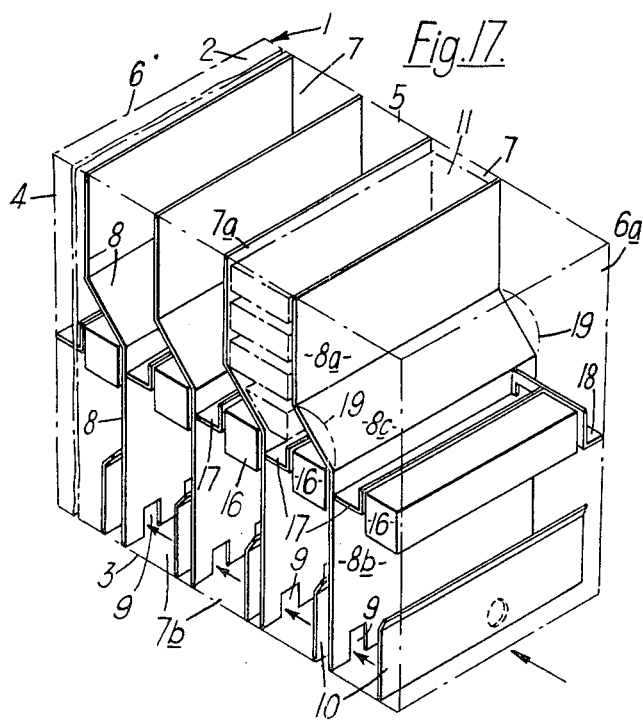

United States Patent Office 3,228,859
Patented Jan. 11, 1966

3,228,859
MULTISTAGE FLASH EVAPORATORS
Adolf Frankel and Hugh Robert Morton Craig, Newcastle-on-Tyne, England, assignors to Richardsons, Westgarth & Co. Limited, Northumberland, England
Filed Sept. 13, 1960, Ser. No. 55,682
5 Claims. (Cl. 202—173)

This invention relates to evaporators, particularly evaporators for distilling sea water or brackish water.

Many if not most modern evaporators are designed to operate on the flash principle. Generally, a flash-type evaporator comprises heat transfer tubes arranged in a number of series-connected heater stages each associated with a flash stage. Liquid to be evaporated is conveyed through the tubes and during its passage therethrough is gradually preheated by vapour flashed off in each of the successive flash stages. Due to the temperature difference between the vapour and the liquid in the tubes the former condenses on the external tube surfaces. The liquid before being transferred from the last heater stage to the first flash stage is heated further by an external source of heat such as steam.

Various designs have been proposed for arranging the main parts of a multi-stage evaporator inside a single vessel. The advantage of housing an evaporator having a considerable number of stages in a single vessel is that interconnecting pipework can be reduced to a minimum, as a result of which the construction is simplified and the manufacturing costs lowered. Yet, in spite of this advantage, the manufacturing costs of a high-performance evaporator, i.e. of an evaporator which operates with a comparatively small input of external heat to produce a predetermined quantity of distillate, are, for a variety of reasons, still very high. This is true even if the evaporator is comparatively large and is designed to produce considerable quantities of distillate.

It is an aim of the present invention to provide an evaporator designed in such a way as to combine more effectively than hitherto manufacturing simplicity and robustness with efficient utilisation of space.

According to the invention, a multi-stage flash-type evaporator comprises a vessel having a number of spaced-apart partition walls arranged so as to divide the vessel into a number of slice-like chambers each having a heater section and a flash section, in which at least a part of each partition wall extending the full distance between two of its opposite edges is contained in a plane or planes other than vertical, and in which the spacing between any pair of adjacent partition walls is substantially constant.

In order that the invention may be thoroughly understood, some examples of sea-water evaporators according to the invention will now be described with reference to the accompanying drawings, in which:

FIG. 1 is a diagrammatic vertical section through one form of evaporator;

FIG. 2 is a diagrammatic perspective view, on an enlarged scale and with parts cut away, of the evaporator shown in FIG. 1; and FIGS. 3–17 are views similar to FIGS. 1 and 2 of further forms of evaporator.

Figure 3:
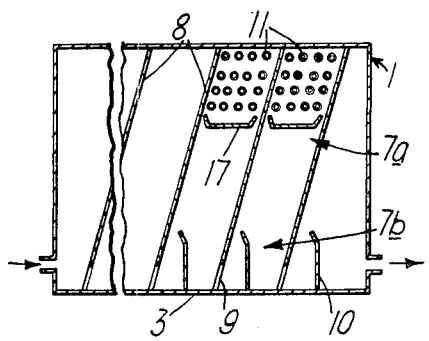

The multi-stage flash-type evaporator shown in FIGS. 1 and 2 comprises a substantially rectangular evaporator vessel 1 having top and bottom walls 2 and 3. A front wall 4 and a rear wall 5, are joined by two opposing end walls 6 and 6a respectively. The vessel is divided into a number of slice-like chambers 7 by spaced-apart internal partition walls 8 the upper and lower edges of which are substantially bounded by the top 2 and the bottom 3 respectively while its two side edges are bounded by the walls 4 and 5. Each partition wall 8 is provided at its bottom with one or more apertures 9 through which in operation heated brine is cascaded in a manner to be described in more detail later on. If desired, the arrangement may be such that the lower edges of the partition walls 8 do not quite extend to the bottom 3 so that the gap thus produced serves as the aperture 9 for cascading the brine from chamber to chamber. Viewing the evaporator in the direction of the arrow F shown in FIG. 2, each chamber 7 is provided with a weir 10 located close to the right-hand face of its left-hand partition wall 8 which in operation is downstream of the apertures 9.

The partition walls 8 are spaced apart along the bottom 3 by a predetermined distance which is the same between any pair of adjacent walls 8. Alternatively, operating requirements may render it essential or expedient to vary the spacing between some pairs of adjacent walls. Whatever spacing is chosen however, the important feature is that the spacing between any pair of adjacent walls remains constant whether measured in a plane parallel with and in close proximity to the bottom 3 or in a parallel plane located at any other height of the same pair of walls. Expressed differently the thickness of the "slice" formed by the pair of walls remains constant.

This remains true notwithstanding the fact that each of the partition walls 8 is divided into an upper part 8a and a lower part 8b of which the latter is contained in a true vertical plane while the former is contained in a plane inclined at an angle of less than 90° relative to the bottom 3. The space between the lower parts 8b of any pair of adjacent walls 8 serves as a flash section 7b, while the space between the upper parts 8a serves as a heater section 7a. This section 7a could also be designated as a condensing space. Each heater section 7a is provided with a nest of tubes 11 arranged with their main axes at right angles to the planes containing the side walls 4 and 5. The tube nests of the heater sections 7a are connected in series so that the sea water to be distilled can be passed through the tubes of each successive heater section.

The evaporator is shown only partially in FIGS. 1 and 2, and in practice there will generally be twenty or more heater and flash sections.

In operation, the sea water or brine is conveyed into the first heater section located closest to the end wall 6a and during its passage from the first heater section to the last one closest to the end wall 6 is heated by vapour flashed off in each of the flash sections 7b. Before the heated brine is transferred into the first of the flash sections, which is the section closest to the end wall 6, it is heated to a higher temperature by an external source of heat, for instance steam, in a so-called heat-input section in order to produce a temperature difference between the last heater section and the first flash section which is sufficient for flashing to take place. The heat-input section may be located outside the vessel 1 but it is advantageous if the space between the wall 6 and the partition wall 8 closest thereto be used for housing the heat-input section. Some of the brine is flashed off in the first flash section while the remainder is cascaded through the apertures 9 and over the weirs 10 into the next flash section of slightly lower temperature and pressure and so forth until reaching the last flash section associated with the first heater section. Brine not evaporated in the last flash section may be recirculated or discharged to waste. The vapour condenses on the external surfaces of the tubes 11 and the resultant distillate is collected in a tray 17 arranged below each tube nest 11. The distillate may be withdrawn from each heater section individually; alternatively, the arrangement may be such that the trays 17 are connected in series and the distillate is withdrawn from a single point. A wall substantially parallel with the bottom 3 may be arranged in each chamber at a height at which the two planes in which the two wall parts 8a and 8b are contained intersect. In this instance, the wall has to be provided with a suitable orifice for the vapour to pass through from below.

Figure 4:
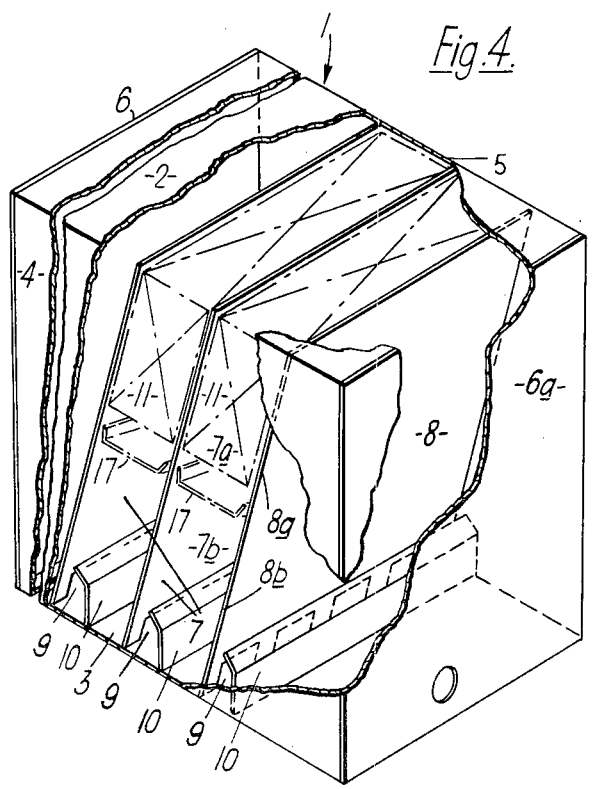

The evaporator illustrated in FIGS. 3 and 4 is similar to that shown in FIGS. 1 and 2 except that the two parts 8a and 8b of each of the partition walls 8 are contained in one plane, all planes containing the walls 8 being parallel with one another and inclined at an angle of less than 90° relatively to the bottom 3.

Turning now to the evaporator illustrated in FIGS. 5 and 6, the vessel 1 is again divided into slice-like chambers 7 by the walls 8. In this instance, however, the edges of the walls 8 are substantially bounded by the two pairs of opposing front and rear walls 4 and 5 and end walls 6 and 6a respectively so that the walls 8 divide the vessel 1 into a number of chambers one stacked above the other in a substantially vertical arrangement. The walls 8 extend through a reinforcing structure 12 contained in a plane substantially parallel with the two side walls 6 and 6a. Further, the structure 12 serves for dividing the walls 8 into the two parts 8a and 8b, the spaces to the right of the structure 12 in the drawing forming the heater sections 7a while the spaces to the left form the flash sections 7b. The structure 12 may be angle iron or plate cut-offs welded together into a frame having comparatively large apertures 13 through which vapour produced in the flash sections 7b can pass into the heater section 7a, in each of which a nest of tubes 11 is again arranged. The walls 8 are spaced along the wall 3a, and all the wall parts 8a are arranged parallel with the bottom 3 whereas the wall parts 8b on the other side of the structure 12 are contained in planes inclined at an angle of less than 90° relatively to the bottom 3. Yet, as in the case of the evaporators illustrated in FIGURES 1-4, the spacing between any pair of walls 8, or the thickness of the "slice," measured in any plane parallel with the side walls 8 and 8a remains constant. Again, as in the case of the preceding evaporators, some pairs of walls 8 in some part of the evaporator may, for reasons already indicated, be spaced by a distance which is different from that by which the remaining pairs are spaced. The principle of the thickness of the slice being constant remains unaffected.

Each heater section is again provided with a tray 17 for collecting the distillate produced by the condensation of the vapour on the external faces of the tubes 11. The distillate-withdrawal arrangements may be of the same type as those previously described. Generally, the operating cycle in the evaporator of FIGS. 5 and 6 is the same as in the evaporators of 1-4, but the vertical arrangement of the flash sections is exploited in as far as unevaporated brine is transferred into the next lower chamber at least partially by the action of gravity.

In contrast to the arrangement shown in FIGS. 5 and 6, the wall parts 8a, instead of being parallel with the bottom 3, may be contained in planes inclined at an angle of less than 90° relatively to the bottom 3 in a direction opposite to the direction in which the parts 8b are inclined. In this instance, it is advantageous for the angles of inclination to be identical, and an evaporator of this construction is shown in cross-section in FIG. 7. Alternatively, the arrangement may be such that the wall parts 8b are located parallel with the bottom 3 and the parts 8a are inclined. This is shown in FIG. 8. None of these modifications is in any way detrimental to the principle of keeping constant the spacing between adjacent walls 8.

The edges of the dividing walls 8 illustrated in FIGS. 9 and 10 are bounded, as in the previous evaporators, by the four walls 4, 5, 6 and 6a respectively. In general, the design of the evaporator illustrated in FIGS. 9 and 10 differs from that illustrated in FIGS. 5 and 6 only by a different arrangement of the walls 8 each of which is contained entirely in a horizontal plane, i.e., a plane parallel with the bottom 3 of the vessel 1. The method of operation of this evaporator is the same as the one shown in FIGS. 5 and 6.

The dividing walls 8 in the two evaporators shown in FIGS. 11 and 12 and FIGS. 14 and 15 extend beyond the structure 12 through a second reinforcing structure 14 contained in a plane lying parallel to the plane containing the structure 12. The design of the structure 14 with its large apertures 15 is substantially identical to the design of the structure 12. The two reinforcing structures serve to divide the chambers 7 between any pair of adjacent walls 8 into three sections, i.e., each chamber in addition to the heater sections 7a and the flash sections 7b is provided with a third section 7c located between the sections 7a and 7b and used for separating any brine particles that may have been entrained in the vapour produced in the flash sections 7b before the vapour reaches the heater sections. The parts of the walls located between the separator section are shown at 8c.

Each of the wall parts 8a, 8b and 8c is contained in a different plane. In the evaporator illustrated in FIGS. 11 and 12, the parts 8a and 8b are contained in two different planes each of which is parallel with the bottom 3 of the vessel, while the parts 8c are contained in a plane inclined at an angle of less than 90° relatively to the bottom 3. This arrangement may be reversed so that the parts 8a and 8b are inclined and the parts 8c are parallel with the bottom 3. Such a construction is shown in cross-section in FIG. 13, and in this instance it is advantageous for the planes to be inclined in opposite directions. The arrangement illustrated in FIGS. 14 and 15, in which the parts 8b are located in planes parallel with the bottom 3, and the parts 8a and 8c are contained in planes inclined in opposite directions at less than 90° relatively to the bottom 3, has proved to be particularly advantageous. In all instances in which more than one part of the dividing wall 8 is inclined at an angle of less than 90° relatively to the bottom of the vessel, it is preferable for the angles of inclination to be substantially equal.

Although the different parts of each wall 8 are contained in different planes, the principle of the spacing between any pair of adjacent walls 8 remaining constant still applies. As in the case of the evaporators illustrated in FIGS. 5 and 6 and FIGS. 9 and 10, unevaporated brine is transferred from an upper flash section to the next lower one at least partially by the action of gravity.

Each partition wall of the evaporator illustrated in FIGS. 16 and 17 is bounded, like the partition walls in the evaporators illustrated in FIGS. 1 and 2 and FIGS. 3 and 4, by the evaporator top and bottom and two opposing side walls, but differs from these other constructions in that each wall comprises three parts, i.e., an upper part, an intermediate part and a lower part. The space between the lower parts 8b of any pair of adjacent partition walls is used as the flash section 7b and for housing a separator 16 and a distillate tray 17 each of which is arranged to discharge the distillate into a distillate-collecting trough 18. If required, the entire space between the wall parts 8b may be used as the flash section, in which case the separator 16 and the tray 17 may be arranged in the space between the intermediate wall parts 8c. However, in general the spaces between the intermediate and upper wall parts 8a and 8c respectively form the heater sections 7a in each of which four nests of tubes 11 are arranged. The upper and lower parts of each partition wall are contained in two vertical planes while their intermediate parts 8c are contained in a plane inclined at an angle of less than 90° relatively to the bottom of the vessel. The intermediate parts 8c, instead of being flat, may be curved as indicated by dash-and-dotted lines 19 so as to form part of a cylinder. The advantage of this arrangement is that the velocity of the vapour emerging from the separator 16 is maintained substantially constant, while if the part 8c is flat the velocity of the emerging vapour first tends to increase and then to decrease again when it is about to impinge on the external tube surfaces.

In contrast to the evaporators illustrated in FIGS. 11 and 12 and FIGS. 14 and 15, the space between the intermediate parts 8c in the evaporator shown in FIGS. 16 and 17 is used to enlarge the heater section. Due to the cross-sectional shape of the space between the parts 8c, the number of tubes in the lowermost tube nest is less than the number in each of the remaining nests. In the construction illustrated, all the nests in each heater section are connected in parallel but may, if required, be connected in series. The tube nests are mounted in two common tube plates one at either end of the nests. Instead of providing separate tube plates for each heater section, tube plates accommodating the tube nests of two or more heater sections may be used. In this instance, the tube plates common to a number of heater sections are arranged in such a way as to permit the brine to flow successively through each of the heater sections. Depending on the lengths of the tubes in each nest, a wall parallel with the front and rear walls 4 and 5 and provided with apertures suitable for the tubes to pass therethrough may be provided in the heater sections to prevent the tubes from sagging. The number of tube nests in each heater section may be increased or decreased to suit manufacturing requirements.

The multi-stage evaporators described above ensure that all the space available inside each stage, or chamber, is used for carrying heat transfer surfaces, or for transferring the brine from stage to stage and for flashing it off in the individual stages, or for carrying the vapour from the flash spaces to the heater spaces. The transfer passages between the flash section and heater section is gainfully utilised for the installation of adequate moisture separation devices, or for suitable means which ensure that the distillate is sufficiently pure, or for measuring the capacity of the heater section or flash section. The evaporators described above ensure that there are no odd corners and/or other wasted space in any chamber, yet constitute simple arrangements which are easy to manufacture and which lend themselves to repetitive production methods.

Although the evaporators illustrated and described are sea-water evaporators, an evaporator according to the invention is not restricted to the treatment of sea water. Further, the means for collecting and withdrawing the distillate may be varied and the number of reinforcing structures may be increased without thereby going beyond the scope of the invention. Although the evaporator vessel in each of the embodiments described is of substantially rectangular cross-section, the invention is not restricted to using a vessel of this particular shape. Also, the dividing walls 8 need not be inclined all in the same direction.

We claim:

1. A multi-stage, flash type evaporator for producing distilled water, said evaporator comprising a plurlaity of chambers formed by generally parallel, aligned partition walls of rectangular shape and identical size, said partition walls being completely bounded by two pairs of parallel side walls, the partition walls being perpendicular to one pair of parallel side walls, and at least a portion of each partition wall being inclined with respect to one wall of the other pair of parallel side walls, a liquid flashing space in one portion of each chamber and a condensing space in the other portion of the chamber, said condensing space being offset from the liquid-flashing space and provided with a plurality of condensing tubes, a condensate collector positioned within each condensing space beneath the condensing tubes, said condensing space being sufficiently offset with respect to the liquid flashing space that the condensate collector positioned below the condensing tubes will provide a passageway for the vapors to flow to the condensing tubes and means in each chamber for receiving and discharging the distillable liquid.

2. The invention as set forth in claim 1 and wherein the entire partition wall is inclined with respect to one wall of the other pair of parallel side walls.

3. The invention as set forth in claim 1 and wherein that portion of each partition wall defining the liquid flashing space is perpendicular to a first wall of the other pair of parallel side walls and the portion of the partition wall defining the condensing space is inclined to the second wall of the pair of parallel side walls.

4. The invention as set forth in claim 1 and wherein each partition wall is divided into two portions, the corresponding portions of the partition walls being equal in size, one corresponding set of portions of the partition walls being inclined to the first wall of the other pair of parallel side walls and the second corresponding set of portions of the partition walls being oppositely inclined to the second wall of the other pair of parallel side walls, the two portions of each partition wall meeting along a line intermediate the other pair of parallel side walls.

5. The invention as set forth in claim 1 and wherein each partition wall is divided in three portions, the portions of each partition wall adjacent their respective wall of the other pair of parallel side walls being offset from each other and perpendicular to their aforesaid respective wall, and the intermediate partition wall portion being inclined so as to connect the aforesaid offset portions of said partition wall.

References Cited by the Examiner

UNITED STATES PATENTS

| 661,929 | 11/1900 | Duff _____ | 159—31 X |
| 699,038 | 4/1902 | Thoens _____ | 159—31 X |
| 1,524,184 | 1/1925 | Lawrence _____ | 159—18 |
| 2,073,738 | 3/1937 | Faber _____ | 159—18 X |
| 2,750,999 | 6/1956 | De Vries _____ | 159—31 X |
| 2,759,882 | 8/1956 | Worthen et al. | |

FOREIGN PATENTS

| 1,129,930 | 5/1962 | Germany. |
| 815,796 | 7/1959 | Great Britain. |

OTHER REFERENCES

"Evaporation Plants Solve Water Shortages," article in Chemical Eng., October 1956, pages 126, 128, 130, 132, and 134.

NORMAN YUDKOFF, *Primary Examiner.*

CHARLES O'CONNELL, BENJAMIN BENDETT,
*Examiners.*